J. BARLETTA.
ENDLESS TREAD TRACTOR.
APPLICATION FILED MAR. 3, 1919.
1,364,020.
Patented Dec. 28, 1920.
2 SHEETS—SHEET 1.
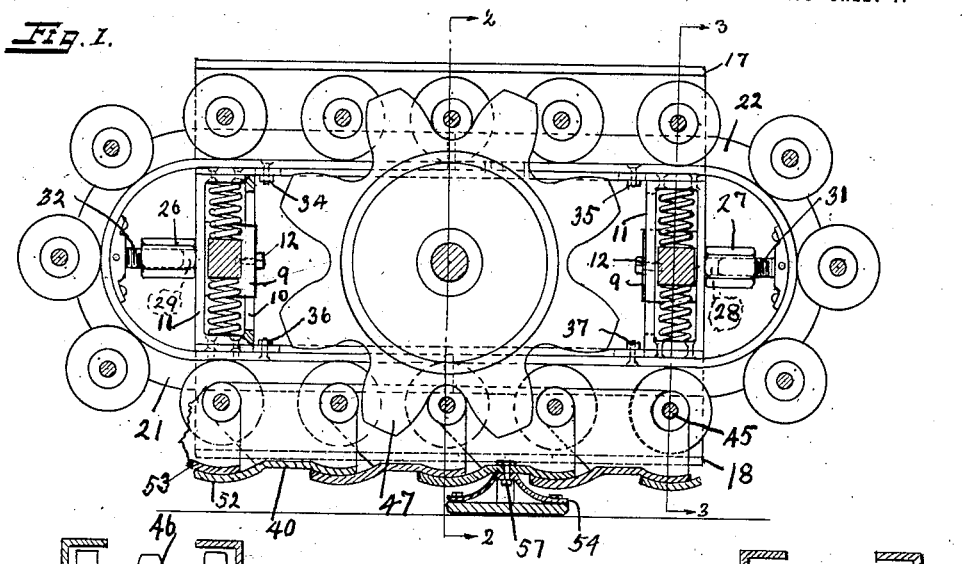
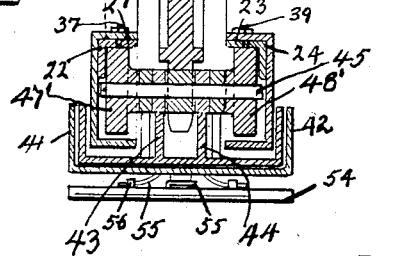
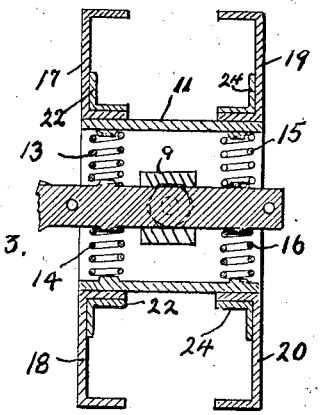
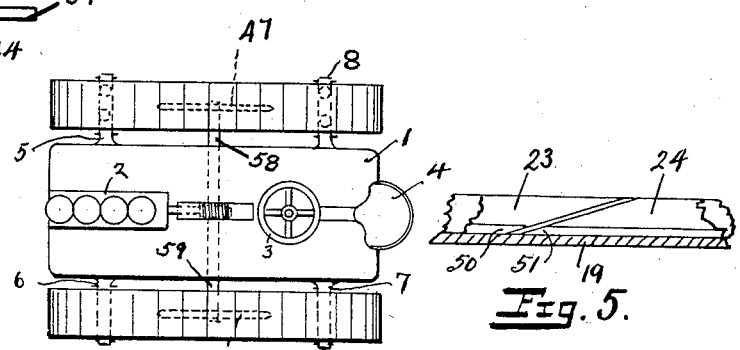
INVENTOR
*J. Barletta.*
BY
*Carlos P. Griffin*
ATTORNEYS J. BARLETTA.
ENDLESS TREAD TRACTOR.
APPLICATION FILED MAR. 3, 1919.
1,364,020.
Patented Dec. 28, 1920.
2 SHEETS—SHEET 2.
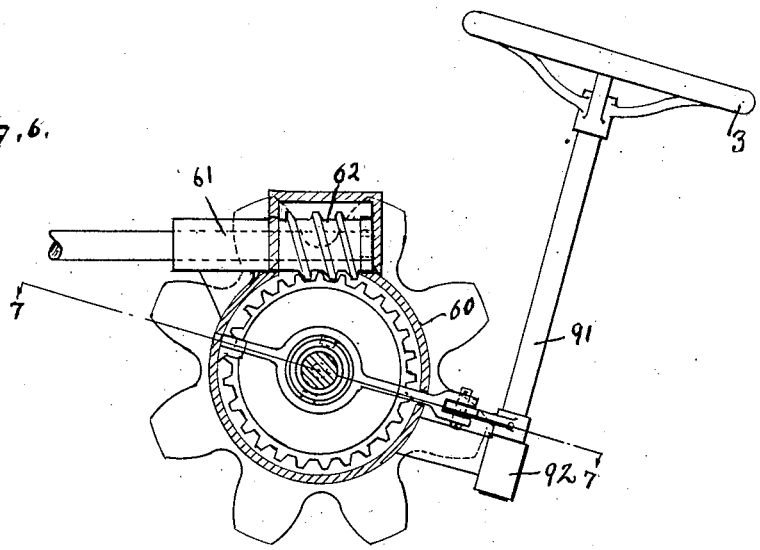
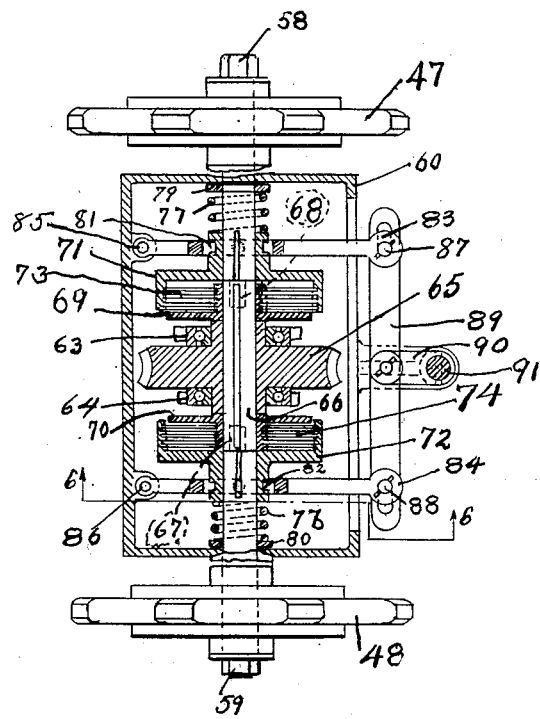
INVENTOR
J. Barletta.
BY
Carlos P. Griffin
ATTORNEYS

UNITED STATES PATENT OFFICE.

JOHN BARLETTA, OF SAN FRANCISCO, CALIFORNIA.

ENDLESS-TREAD TRACTOR.

1,364,020.

Specification of Letters Patent.

Patented Dec. 28, 1920.

Application filed March 3, 1919. Serial No. 280,256.

*To all whom it may concern:*

Be it known that I, JOHN BARLETTA, citizen of the United States, residing at San Francisco, in the county of San Francisco and State of California, have invented new and useful Endless-Tread Tractors, of which the following is a specification in such full and clear terms as will enable those skilled in the art to construct and use the same.

This invention relates to an endless tread tractor one object of which is to provide a series of rollers for the tractor to ride upon the endless tread.

Another object of the invention is to provide a driving sprocket which will strike the endless tread in only two places thereby preventing the rapid deterioration of the chain from interfering with the continuous use of the tractor.

It will be understood by those skilled in the art that with endless tread tractors, there is a very considerable wear of the chain due to the accumulation of dirt and sand which causes the links to wear the pins and themselves so that in a short time, the chain has elongated itself so much that it will no longer work over the ordinary sprocket wheels.

In the present instance, means is provided to take up the slack of the chain as it may wear equally at both ends of the machine and the driving sprocket contacting with only two rollers at a time, so that a very considerable amount of wear of the links is permissible before the chain becomes useless.

Another object of the invention is to provide means whereby the tractor may be easily steered.

Another object of the invention is to provide spring held growser plates which will permit the machine to easily pass over rough ground and all ordinary obstructions without serious difficulty.

Other objects of the invention will appear as the description proceeds.

An embodiment of the invention is shown in the accompanying drawings in which the same reference numeral is applied to the same portion throughout, but I am aware that there may be modifications thereof.

In the drawings:

Figure 1 is a vertical sectional view of one of the endless treads,

Fig. 2 is a sectional view of the tread shown in Fig. 1 on the line 2—2 looking in the direction of the arrows, Fig. 3 is a sectional view of the frame for holding the endless tread, on the line 3—3 Fig. 1, looking in the direction of the arrows, Fig. 4 is a complete tractor on a smaller scale, Fig. 5 is a plan view of a portion of the frame, illustrating the manner of adjusting it upon the tightening of the chain, Fig. 6 is a vertical sectional view of the box within which the driving and steering mechanism is installed, taken on the line 6—6, Fig. 7, and looking in the direction of the arrows, and Fig. 7 is a sectional view of the steering and driving mechanism on the line 7—7, Fig. 6 looking down.

The tractor has any suitable frame 1 upon which the engine 2, steering wheel 3 and seat 4 are mounted. The frame is supported by means of four horizontally extending axles 5 to 8 inclusive. Each of these axles extends through a slidable block 9 of which there are four, said blocks being movable in the slots 10 of the four frames 11.

The blocks are rigidly connected with the shafts 5 to 8 inclusive by means of set screws 12. The shafts 5 to 8 inclusive are held in an intermediate position with respect to the frames 11 by means of spiral springs 13 to 16 in each of the frames. The frames 11 are each rectangular in shape and each is in turn connected to channel steel members 17 and 18; the channel member 17 connecting two of the frames 11 at the top and the member 18 connecting them at the bottom. Opposite these two channels 17 and 18 and secured to the end of two of the frames 11, are two oppositely placed, identical channels 19 and 20.

These four channels, of which there is a complete set on each side of the machine, are rigidly secured to two of the frames 11. Extending through them are four U shaped angle irons 21, 22, 23 and 24. These angle irons 21 to 24 inclusive form a track for the rollers of the endless tread; and they are adjusted by means of the two nuts 26, 27 which are revoluble on the studs 28 and 29 carried by the frames 11.

Rigidly connected with the angle iron tracks 21 to 24 inclusive are two screws 31 and 32, the result of which construction is that by the rotation of the nuts 26, and 27 the four tracks will be moved nearer together or farther apart as may be desired; and when placed in a given adjustment they are secured in that adjustment by tightening the bolts 34 to 37 inclusive which pass through the horizontal portions of said tracks and the inner flanges of the channels 17 and 18.

The tracks 23 and 24 are similarly secured to the channels 19 and 20 as indicated by the bolts 38 and 39.

The endless tread consists of a plurality of nested growser plates 40, each of which has upturned flanges 41, 42 at its outer edges widened at one end and narrowed at the other so as to fit together. These growser plates also have two centrally disposed webs 43, 44 which webs form the links for connecting the several growser plates together. These links are shaped to lie side by side, alternately, as indicated in Fig. 1; and are connected together by means of the pins 45.

The pins 45 carry small rollers 46 with which the driving sprockets 47, 48 contact, and they are each also provided with two rollers 47', 48' which rollers always run in contact with the angle irons 21 to 24 inclusive as will be observed in Fig. 2. The ends of the angle iron tracks 21 to 24 inclusive are cut on an angle as indicated at 50, 51 in order to permit the tracks to be moved a considerable distance apart without producing a bump for the rollers 47, 48 to strike.

It will be noted that the growser plates are curved at one end as indicated at 52, and at the other end as indicated at 53, to fit closely together to prevent the ingress of dirt. The growser plates are each individually connected to a ground plate 54 and this ground plate is connected to the growser plates by means of a four prong spring 55. Said spring passes through loops 56 carried by the plate 54. These springs are connected with the growser plates by means of a suitable bolt 57, the object of which is to provide a ground plate which will be capable of rocking from side to side or from end to end, as may be necessary, in passing over rough ground.

The driving sprockets are carried upon the opposite ends of two alined transversely extending shafts 58 and 59. The shafts 58, 59 extend into a gear box 60, which gear box has suitable bearings 61 for the worm gear 62 on the driving shaft, and other suitably supported bearings 63, 64 for the worm wheel 65 which the worm drives.

The worm wheel 65 is carried by a short shaft 66 which has holes in each end to receive projected stub shafts 67, 68 carried by the inner ends of the shafts 58 and 59.

The short shaft 66 is provided with two fixed disks 69 and 70, which with the cups 71 and 72 slidably mounted on the shafts 58 and 59 respectively, form with the plurality of disk plates 73 and 74 a pair of disk clutches of a well known type on each side of the worm wheel 65.

The disk 73 and the disk 74 are pushed into engagement by the pressure of the springs 77 and 78 upon the hubs of the cups 71, 72, said springs bearing against rings 79 and 80 inside the gear box. The hubs of the cups are grooved as indicated at 81 and 82 to enable pins on the yoke levers 83 and 84 to relieve the pressure of the springs upon the cups for the purpose of driving the tractor treads one side or the other side of the machine.

The levers 83 and 84 are pivoted at 85 and 86 within the gear box, and at their opposite ends there are pins 87 and 88 which pass through slots in the ends of a bar 89. Said slots are so arranged as to permit the bar to move in one direction without interfering with the lever at its opposite end. The bar 89 is pivotally connected to a short lever 90 on the lower end of the steering post 91. The steering post is supported in a journal 92 connected with the gear box 60.

In operation, the steering wheel is rotated slightly to the right or left, as may be desired. When the steering wheel is rotated to the right, the bar 89 is moved up, Fig. 7, with the result that the clutch plates 73 are released from each other and the sprocket wheel 48 drives forwardly alone, thereby causing the tractor to turn to the right and an opposite action takes place when it is desired to turn the tractor to the left.

The engine is connected with the driving gear casing which takes the same motion as the treads by any suitable flexible means forming no part of the present invention and therefore not illustrated.

Having thus described my invention, what I claim as new and desire to secure by Letters Patent of the United States is as follows:

1. An endless tread tractor comprising a main frame for the support of an engine and driver, a pair of axles connected therewith, boxes to which the axles are connected, slides in which said boxes move, a pair of endless tracks connected with said slides, springs above and below the axles to hold them in a given position with respect of the frame and endless treads having rollers engaging said tracks for the support and propulsion of the tractor.

2. An endless tread tractor comprising a frame for the support of an engine and driver, a pair of longitudinally adjustable tracks connected with the frame, springs to hold the tracks in a given position with respect to the frame, and endless treads having rollers to engage said tracks for the support of the frame.

3. An endless tread tractor comprising a main frame for an engine and driver, a pair of endless tracks resiliently connected to the main frame, means to adjust the longitudinal relationship of the endless tracks, an endless tread passing around each endless track, rollers carried by said endless treads and in contact with the tracks, a sprocket wheel for driving the endless tread, and channel members through which the rollers pass to prevent the endless treads from being forced out of engagement with the driving sprockets.

4. A ground plate for endless tread tractors comprising a link carrying a growser plate, a ground plate connected to the growser plate by means of a four armed spring capable of permitting the ground plate to move in two planes.

5. An endless tread for tractors comprising a growser plate having two webs projecting therefrom to form the tread links, pins at the ends of the webs for connecting the next adjacent links thereto, a central roller on each pin to engage the drive sprocket, and two larger outer rollers on each pin to carry the load upon the endless tread.

6. An endless tread tractor comprising a main frame adapted to support an engine and driver, a pair of endless tracks resiliently connected to the main frame, the tracks comprising channel irons and two pairs of oppositely positioned angle irons capable of being adjusted longitudinally, an endless tread passing around said angle irons, rollers carried by said tread in contact with the angle irons, and sprocket wheels in contact with the treads for driving them, the sprocket wheels being positioned intermediate the looped ends of the tread so as to touch only two links of the endless tread at one time.

7. An endless tread tractor comprising a main frame for the support of an engine, and driver, a pair of endless tracks resiliently connected to the main frame, means to adjust the longitudinal relationship of the endless tracks, an endless tread passing around each endless track, rollers carried by said treads and in contact with the tracks, means to drive the endless treads, and channel members through which the rollers pass.

8. An endless tread tractor comprising a main frame for the support of an engine and driver, a pair of endless tracks connected with the frame, springs to hold the tracks resiliently in a given position with respect to the main frame, means to adjust the position of the tracks at front and rear, endless treads passing around the tracks, rollers carried by said treads in contact with said tracks, drive sprockets adjacent the middle run of the endless treads and in engagement therewith at top and bottom, and means to prevent the endless treads from passing out of engagement with the drive sprockets.

9. An endless tread tractor comprising a main frame for the support of an engine, and driver, a pair of endless tracks connected therewith, springs to hold the tracks resiliently in a given position with respect to the main frame, means to adjust the position of the tracks longitudinally at front and rear, endless treads passing around the tracks, rollers carried by said treads in contact with said tracks, drive sprockets adjacent the middle run of the endless treads and in engagement therewith at top and bottom, and means to prevent the endless treads from passing out of engagement with the drive sprockets, said means including channel bars placed with their flanges facing each other through which the endless tread rollers pass.

In testimony whereof I have hereunto set my hand this 20" day of February, A. D. 1919.

JOHN BARLETTA.